No. 778,210. PATENTED DEC. 27, 1904.
W. C. ANDERSON & F. L. ARGALL.
DEVICE FOR FORMING AND SIZING CLOSED END TUBES.
APPLICATION FILED FEB. 9, 1904.
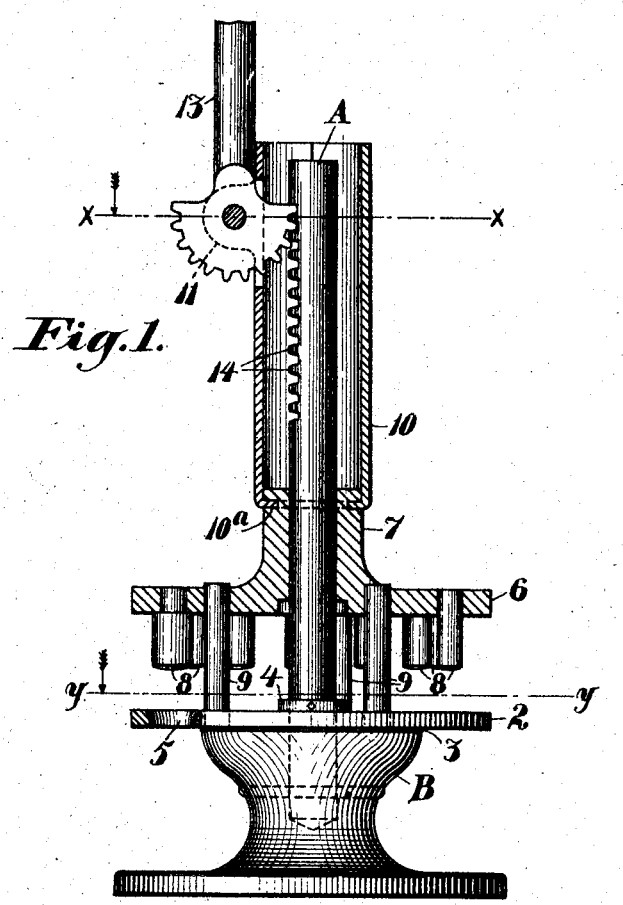
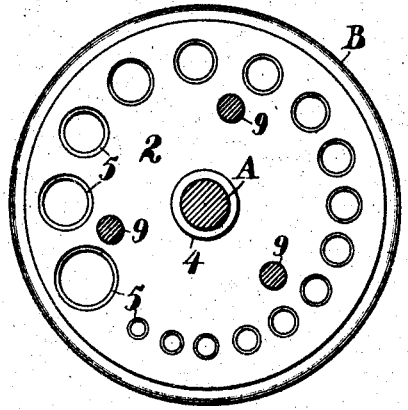
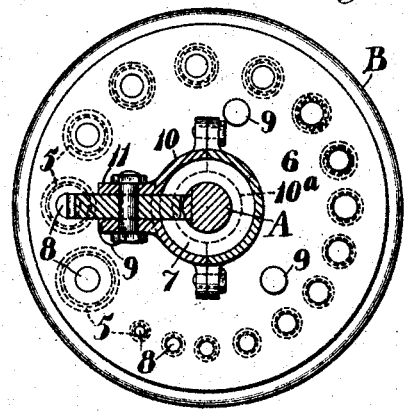
Witnesses:-
Inventors
William C. Anderson
Frank L. Argall
By Geo. H. Strong. atty No. 778,210.                                    Patented December 27, 1904.

UNITED STATES PATENT OFFICE.

WILLIAM C. ANDERSON AND FRANK L. ARGALL, OF SAN JOSE, CALIFORNIA.

DEVICE FOR FORMING AND SIZING CLOSED-END TUBES.

SPECIFICATION forming part of Letters Patent No. 778,210, dated December 27, 1904.

Application filed February 9, 1904. Serial No. 192,782.

*To all whom it may concern:*

Be it known that we, WILLIAM C. ANDERSON and FRANK L. ARGALL, citizens of the United States, residing at San Jose, in the county of Santa Clara and State of California, have invented new and useful Improvements in Devices for Forming and Sizing Closed-End Tubes, of which the following is a specification.

Our invention relates to a machine which is designed for the formation of hollow cylindrical bodies from disks of ductile metal, such as are especially required in the manufacture of tooth-crowns, and for giving such tubes any desired size.

Our invention consists of the parts and the constructions and combinations of parts, which we will hereinafter describe and claim.

Figure 1 is an elevation, partly in section, of our apparatus. Fig. 2 is a horizontal section on line $y\ y$ of Fig. 1. Fig. 3 is a horizontal section on line $x\ x$ of Fig. 1.

The object of our invention is to provide an apparatus for the rapid shaping and sizing of metallic cylinders or tubes having one closed end from suitable disks of metal. This is effected by placing each disk upon a perforated die or surface and forcing them through by means of a corresponding plunger, then transferring the disk to another smaller die and plunger, and so on until it has been gradually shaped and given the desired diameter. In our invention we have provided an apparatus by which this work can be rapidly done without delay to change from one die to another.

As shown in the drawings, A is a vertical standard or post fixed in a suitable supporting-base, as B.

2 is a circular table centrally bored and turnable upon the standard A, having a shoulder 3 below, which determines the height of the table above the bed, and a collar 4 above, which prevents the table being raised from its position. This table has a series of holes 5 made through it around its periphery and approximately equidistant from the center of rotation, these holes diminishing from the largest size required in commencing the work to the smallest required.

6 is a circular carrier having a sleeve or hub, as at 7, which fits and is turnable upon the standard A, and this carrier has a series of plungers 8 projecting from its lower face, these plungers corresponding with the holes 5. 9 represents guides fixed in the table 2 and extending up through holes in the carrier 6, in which holes they fit sufficiently loose to allow the carrier to be moved up and down, while the guides insure the plungers 8 absolutely registering with their respective holes.

The hub 7 has an annular groove or channel made around its upper part, and a tubular casing 10 has its lower edge inturned so as to engage the groove in the part 7, as at $10^a$, whereby the said part 7 is swiveled relative to the casing. It will also be noted that the standard or post is shown as cylindrical and that the rack-teeth are cut into the convex side of the post, which provides a flat portion at the base of the spaces between the teeth, as shown by the dotted line in Fig. 3, which arrangement will prevent the casing turning around the standard. The casing 10 incloses the upper part of the standard A and has an open slot in one side, with lugs 11, between which the lever 13 is fulcrumed. The inner end of this lever carries a toothed segment which engages the teeth 14, formed on or carried by the standard A. As the standard is stationary and the toothed lever is fulcrumed to the casing connected with the hub 7, it will be seen that the upward and downward movement of the lever 13 will raise or depress the table 6 and with it the punches 8. It will be seen that when the lever 13 is pressed down it will, by reason of the engagement of the segment and the toothed rack, cause the segment to move down upon the rack. This downward movement of the lever forces the carrier 6 down and with it its plungers 8, each of which enters a corresponding hole in the die plate or table 2 by reason of the guides 9, fixed in the table and which insure the proper registering of the plungers and die-holes, while at the same time the table and carrier are easily turnable about the standard A by reason of the groove-and-flange connection at 10ᵃ.

The operation will then be as follows: The operator being conveniently seated with reference to the machine places a disk upon the largest opening of the die and by means of the lever 13 depresses the plunger-carrier, and the plunger corresponding with the die-opening will force the disk through, turning the edges up a little. The disk is immediately transferred to the next die and plunger, and so on around the periphery of the table, and the latter is turned, by hand or otherwise, as the operation progresses, so as to bring each die successively in front or with convenient relation to the operator, who can thus rapidly proceed with the work without changing his position.

Having thus described our invention, what we claim, and desire to secure by Letters Patent, is—

1. A device for forming closed-end tubes from metal disks, said device consisting of a central vertical standard, a table having die-openings of different diameters around its periphery, said table turnable about the standard, a carrier slidable and turnable upon the standard having punches upon its periphery corresponding with the die-openings of the table, guides fixed in the table extending through the carrier, and upon which guides the carrier is slidable, a toothed rack carried upon the central post, a lever having a toothed segment engaging the rack, and a casing surrounding the post and carrying said lever, said carrier suspended from and revolubly mounted relative to the casing.

2. The combination in a closed-tube-forming device, of a central standard, a die-table revoluble upon the standard, a punch-carrier revoluble and slidable upon the standard, guides upon which the carrier is movable to maintain the punches in exact registration with the die-openings of the table, a channeled hub or extension of the table, a tubular casing having its lower end loosely engaging said channel, a segment-toothed lever fulcrumed to the casing and a rack fixed to the stationary central post with which said segment engages.

In testimony whereof we have hereunto set our hands in presence of two subscribing witnesses.

WILLIAM C. ANDERSON.
FRANK L. ARGALL.

Witnesses:
S. C. MAYNARD,
W. H. STACY.